United States Patent [19]
Skopic et al.

[11] Patent Number: 5,977,482
[45] Date of Patent: Nov. 2, 1999

[54] WIRE SPLICE

[75] Inventors: Albert D. Skopic; Donald E. Burger, both of York, Pa.

[73] Assignee: Osram Sylvania Inc., Danvers, Mass.

[21] Appl. No.: 09/250,602

[22] Filed: Feb. 16, 1999

[51] Int. Cl.[6] .................................................. H02G 15/113
[52] U.S. Cl. ........................................ 174/92; 174/138 F
[58] Field of Search .................................. 174/92, 91, 93, 174/138 F, 50.51

[56] References Cited

U.S. PATENT DOCUMENTS

| | | | |
|---|---|---|---|
| 47,918 | 5/1865 | Beardslee | 174/93 |
| 1,688,640 | 10/1928 | Levin | 174/93 X |
| 3,009,986 | 11/1961 | Stephens | 174/93 X |
| 3,183,302 | 5/1965 | Wochner et al. | 174/138 F |
| 5,594,213 | 1/1997 | Skopic | 174/91 |

*Primary Examiner*—Kristine Kincaid
*Assistant Examiner*—Chau N. Nguyen
*Attorney, Agent, or Firm*—William H. McNeill

[57] ABSTRACT

A splice that includes two semi-cylindrical splice members joined together for relative pivotal movement into and out of engagement with each other in a closed mode and an open mode, respectively. Each splice member includes a plurality of channels. Respective channels of each splice member are aligned with each other in the closed mode to form respective cavities. The walls of a first cavity are structured and arranged to bear against a first length of wire, and the walls of a second cavity are structured and arranged to bear against a second length of wire. An electrical component is retained in a third cavity and is mechanically and electrically coupled to the first length of wire within the first cavity and the second length of wire in a fourth cavity.

9 Claims, 4 Drawing Sheets

WIRE SPLICE

TECHNICAL FIELD

The present invention relates to a wire splice for connecting conductors together. The wire splice includes an electrical component such as, for example, a capacitor, contained therein and electrically and mechanically connected to the conductors. The wire splice provides strain relief to prevent slippage of a conductor, contained therein, when the conductor is subjected to an axial pull, and protects the electrical component from environmental conditions.

BACKGROUND ART

It is known in the art to mechanically and electrically join together a conductor such as, for example, a monofilament wire of a coaxial cable and another conductor such as, for example, a multifilament wire having an end connected to an insulated terminal housing. By way of example, such connections are typically used with automobile antennas. It is also known to use a wire splice with such connections to provide strain relief when the wires are subjected to axial pull relative to each other. Otherwise, there will be a tendency for the connection to become disconnected due to slippage, particularly slippage of the multifilament wire relative to the monofilament wire. In the absence of a satisfactory wire splice this problem will be aggravated when the wire splice is mounted in place upon a support surface such as an automobile support surface for an antenna conductor. In such instances, if the wire splice does not provide adequate strain relief, there will be a tendency for the connection between wires to break when the multifilament wire is subjected to an axial pull. The reason for this is that the mounted wire splice and monofilament wire will resist movement due to the mounting thereof One wire splice that has proved to be very satisfactory in preventing these problems is illustrated in U.S. Pat. No. 5,594,213 that issued on Jan. 14, 1997 to Albert D. Skopic. This patent is commonly owned with the instant application and is incorporated herein by reference.

In certain applications it is necessary to couple a particular electronic component to one of the conductors which are connected by the wire splice. For example, when a wire splice of the type illustrated in the U.S. Pat. No. 5,594,213 patent is used to connect lengths of antenna conductors, a coaxial cable will typically extend from one end of the splice and a multifilament wire will extend from the other end to an insulated terminal housing which is provided for coupling the antenna to a radio. In order to block unwanted electrical signals from entering the radio coupled to the antenna, a capacitor is provided. Typically, the capacitor will be electrically and mechanically connected to the multifilament wire somewhere between the wire splice and the insulated terminal housing. In order to connect the capacitor in place, the multifilament wire must be prepared, either before or after the antenna conductors have been spliced and positioned in the wire splice housing. The capacitor is then coupled to the multifilament wire. This procedure requires an undesirable step in assembling the vehicle radio system. In addition, the capacitor must then be mounted to a wall of the vehicle or left dangling in place. Neither of these options is desirable. In some applications, it may even be necessary to provide some means to protect the capacitor from environmental conditions.

DISCLOSURE OF THE INVENTION

It is, therefore, an object of the invention to obviate the disadvantages of the prior art.

It is another object of the present invention to provide an improved wire splice.

It is yet another object of the present invention to provide an improved wire splice for use with wires, which are mechanically and electrically connected together, which will prevent substantial wire slippage when one or both of the wires is subjected to an axial pull, and which contains an electrical component.

It is still another object of the present invention to provide a wire splice that obviates the disadvantages of those provided heretofore.

This invention achieves these and other objects, in one aspect of the invention, by providing a wire splice which includes a first splice member and a second splice member. Each splice member comprises a first surface, an opposite second surface, and a first, second third and fourth channel. The first channel extends into the first surface towards the opposite second surface and extends in the direction of a horizontal axis of a respective splice member from a first end towards an opposite second end. The second channel extends into the first surface towards the second surface and extends in the direction of the horizontal axis from the opposite second end towards the first end. The third channel extends into the first surface towards the second surface and extends in the direction of the horizontal axis from the first channel towards the opposite second end. The fourth channel extends into the first surface towards the second surface and extends in the direction of the horizontal axis from the second channel to the third channel. The first splice member is pivotally connected to the second splice member along a pivot axis. The first channel, second channel, third channel and fourth channel of the first splice member are radially in alignment relative to the pivot axis with the first channel, second channel, third channel and fourth channel, respectively, of the second splice member. The first splice member and the second splice member are pivotal into and out of engagement with each other in a closed mode and an open mode, respectively. A coupling for conductors is provided wherein the wire splice of the present invention couples conductors to each other in the wire splice through an electrical component such as a capacitor contained in the wire splice.

BRIEF DESCRIPTION OF THE DRAWINGS

This invention may be clearly understood by reference to the attached drawings in which like reference numerals designate like parts and in which.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
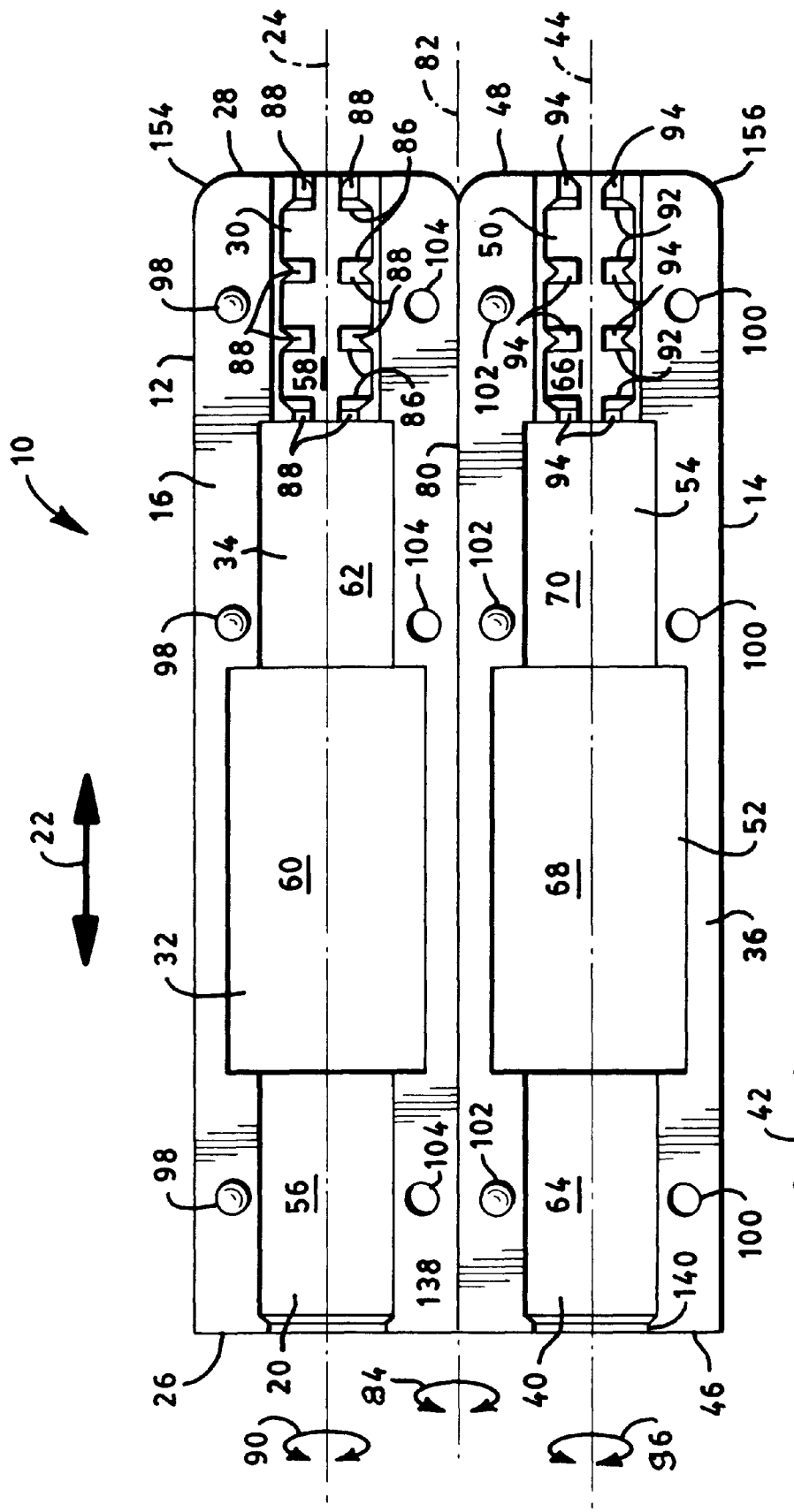
FIG. 1 is a plan view of a wire splice embodying the present invention.
Figure 2:
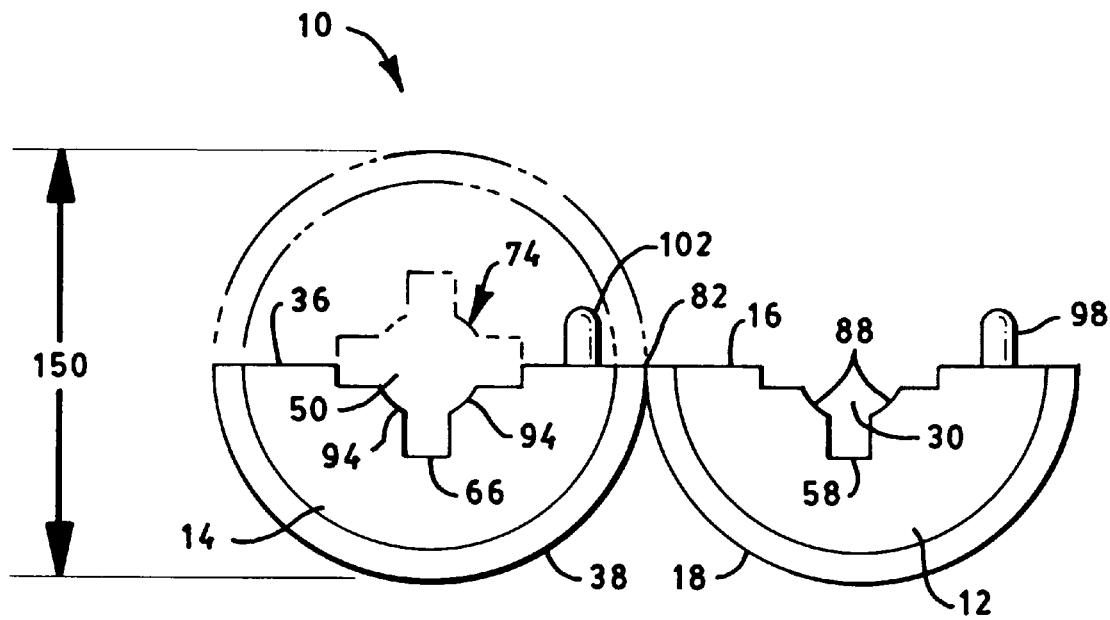
FIG. 2 is an end view of the embodiment of FIG. 1 taken from the right hand side of the FIG. 1 drawing.
Figure 3:
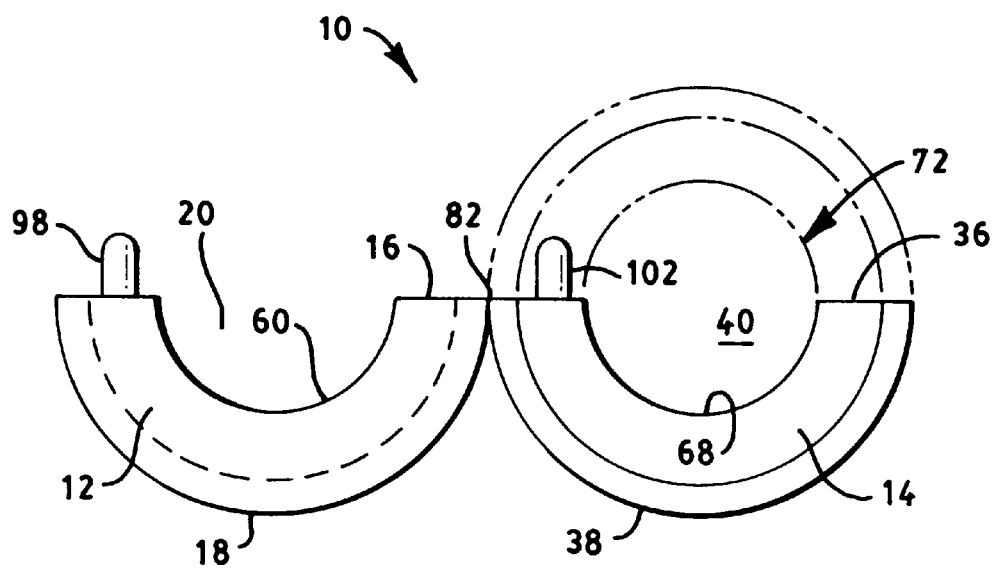
FIG. 3 is an end view of the embodiment of FIG. 1 taken from the left-hand side of the FIG. 1 drawing.

The embodiment of this invention that is illustrated in FIGS. 1 to 3 is particularly suited for achieving the objects of this invention. FIGS. 1 to 3 depict a splice 10 which comprises a first splice member 12 and a second splice member 14. Splice 10 is made of an insulative material such as plastic. Although not necessary, in the embodiment of FIGS. 1 to 3 splice members 12 and 14 are identical. Splice member 12 comprises a surface 16 and an opposite surface 18. A channel 20 extends into the surface 16 towards the opposite surface 18. Channel 20 extends in the direction 22 of a horizontal axis 24 of the splice member 12 from an end 26 towards an opposite end 28. A second channel 30 extends into the surface 16 towards the opposite surface 18. Channel 30 extends in the direction 22 of horizontal axis 24 from the end 28 towards the end 26. A third channel 32 extends into the surface 16 towards the opposite surface 18, and extends in the direction 22 from the channel 20 towards end 28. A fourth channel 34 extends into the surface 16 towards the opposite surface 18, and extends in the direction 22 from the channel 30 to the channel 32.

Like splice member 12, splice member 14 comprises a surface 36 and an opposite surface 38. A channel 40 extends into the surface 36 towards the opposite surface 38. Channel 40 extends in the direction 42 of a horizontal axis 44 of the splice member 14 from an end 46 towards an opposite end 48. A second channel 50 extends into the surface 36 towards the opposite surface 38. Channel 50 extends in the direction 42 of horizontal axis 44 from the end 48 towards the end 46. A third channel 52 extends into the surface 36 towards the opposite surface 38, and extends in the direction 42 from the channel 40 towards end 48. A fourth channel 54 extends into the surface 36 towards the opposite surface 38, and extends in the direction 42 from the channel 50 to the channel 52.

In the embodiment of FIGS. 1 to 3 the splice 10 is generally tubular, each splice member 12 and 14 being generally semi-cylindrical in shape. The walls 56, 58, 60 and 62 of channels 20, 30, 32 and 34, respectively, and the walls 64, 66, 68 and 70 of channels 40, 50, 52 and 54, respectively, are substantially semi-cylindrical.

Figure 6:
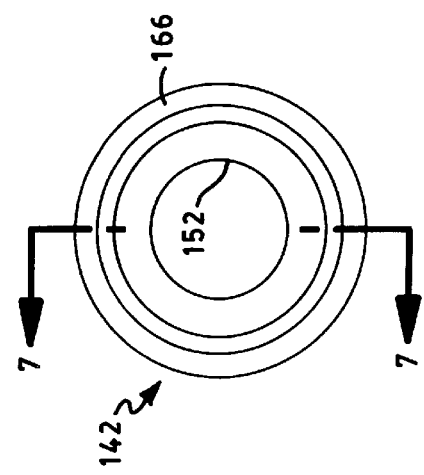
FIG. 6 is an end view of a sleeve of the present invention for use with the wire splice illustrated in FIGS. 1–3.
Figure 4:
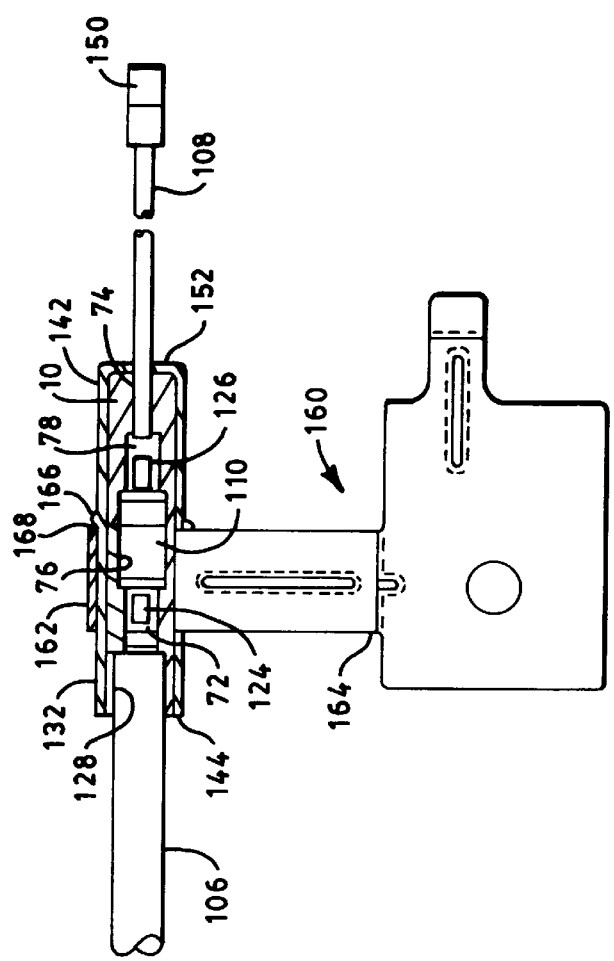
FIG. 4 is a partial sectional view of the wire splice of FIGS. 1–3 assembled for use with a sleeve and mounting member.

The first splice member 12 is coupled to the second splice member 14 in a closed mode, as depicted in phantom lines in FIGS. 2 and 3. In such closed mode, surface 16 of splice member 12 abuts surface 36 of splice member 14 and channels 20, 30, 32 and 34 of splice member 12 are in alignment with channels 40, 50, 52 and 54, respectively, of splice member 14. In such closed mode, channels 20 and 40 form a channel cavity 72, and channels 30 and 50 form a channel cavity 74, as illustrated in FIGS. 2, 3 and 6. Similarly, in the closed mode channels 32 and 52 form a channel cavity 76, and channels 34 and 54 form a channel 78, as illustrated in FIG. 4. The splice member 12 may be uncoupled from the splice member 14 in an open mode, as depicted in solid lines in FIGS. 2 and 3.

In the preferred embodiment, splice member 12 is pivotally connected to splice member 14. For example, in the embodiment of FIGS. 1 to 3, splice member 12 is pivotally connected to splice member 14 by means of web 80 formed integrally with splice members 12 and 14. Web 80 extends along a pivot axis 82. In such embodiment, channels 20, 30, 32 and 34 and channels 40, 50, 52 and 54, respectively, are radially in alignment relative to pivot axis 82 as depicted in FIGS. 2 and 3; that is, the radial distance between axis 24 and 82 is equal to the radial distance between axis 44 and 82 so that the splice members 12 and 14 may be pivoted about axis 82, in the circumferential direction 84 relative to axis 82, into and out of engagement with each other in the closed mode and the open mode, respectively, illustrated in FIGS. 2 and 3.

At least one channel 30, 50 will comprise one or more protuberances, and in the preferred embodiment each channel 30, 50 will comprise at least one protuberance. For example, in the embodiment of FIGS. 1 to 3 channel, 30 comprises four rows 86 of protuberance 88. Each row 86 extends in a circumferential direction 90 relative to axis 24 and comprises a plurality of protuberances 88 that are equally spaced in circumferential direction 90. For example, in the embodiment depicted in FIGS. 1 and 2, each row 86 includes two protuberances 88. Each protuberance 88 extends radially from surface 58 towards axis 24. In a like manner, channel 50 comprises four rows 92 of protuberances 94. Each row 92 extends in a circumferential direction 96 relative to axis 44 and comprises a plurality of protuberances 94 that are equally spaced in circumferential direction 96. For example, in the embodiment depicted in FIGS. 1 and 2, each row 92 includes two protuberances 94. Each protuberance 94 extends radially from surface 66 towards axis 44. In the embodiment of FIGS. 1 and 2, axes 24, 44 and 82 are parallel, and axis 24 and 44 are coincident when in a closed mode to form a longitudinal axis of the splice 10.

In the preferred embodiment, splice member 12 may be coupled to splice member 14 by one or more couplers. For example, splice member 12 may comprise at least one coupler and splice member 14 may comprise at least one mating coupler. In the embodiment of FIGS. 1 to 3, splice member 12 includes three couplers in the form of protuberances 98 and splice member 14 includes three mating couplers in the form of recesses 100. Similarly, splice member 14 includes three couplers in the form of protuberances 102 and splice member 12 includes three mating couplers in the form of recesses 104. By dimensioning the protuberances and recesses to provide respective snap fits therebetween, when splice member 12 and splice member 14 are pivoted about axis 82 to a closed position as depicted in phantom lines in FIGS. 2 and 3, protuberances 98 will mate with recesses 100 and protuberances 102 will mate with recesses 104 to lock or otherwise couple splice member 12 to splice member 14.

Figure 5:
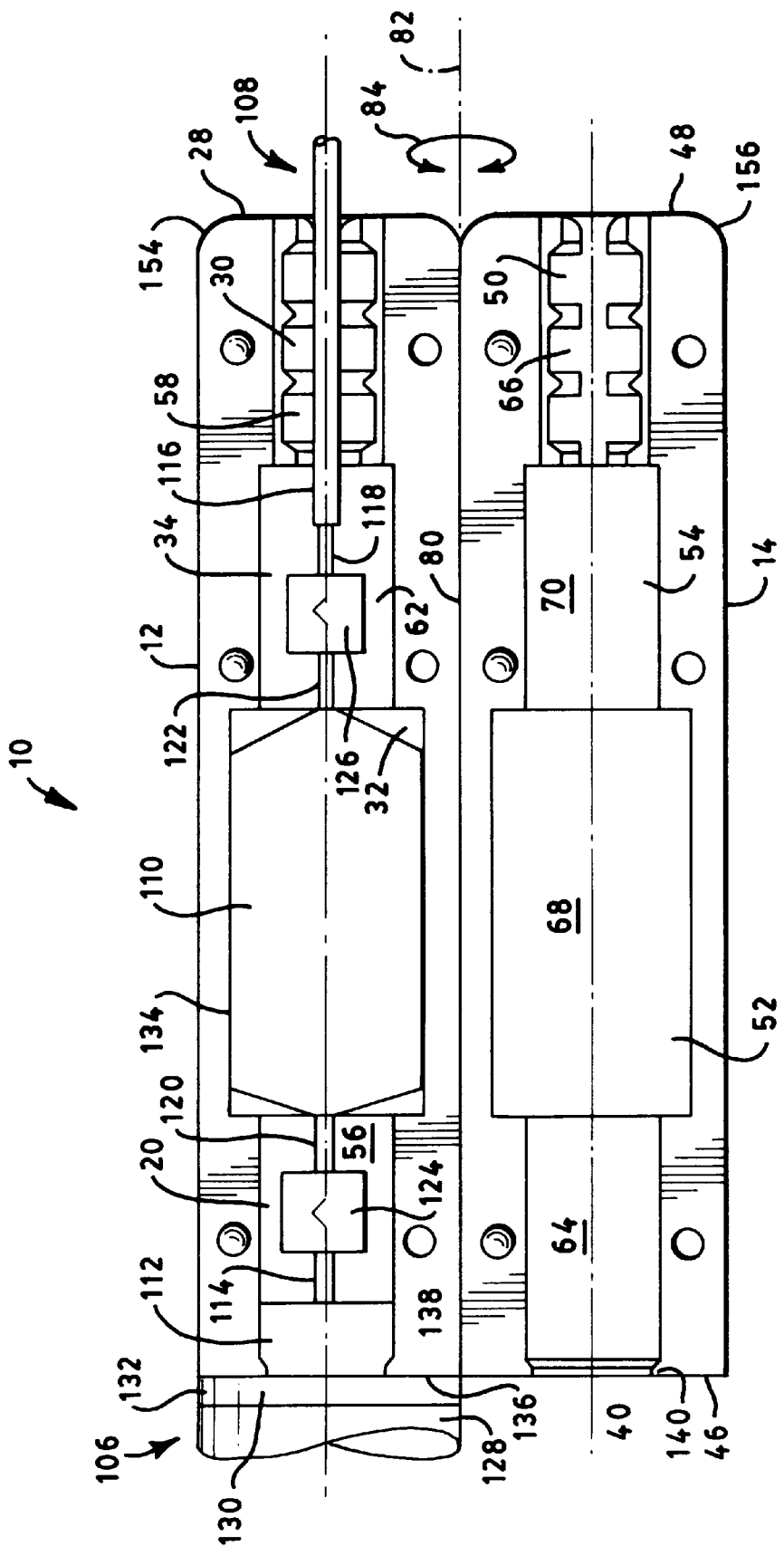
FIG. 5 is a plan view of the wire splice of FIGS. 1–3 including conductors and an electrical component therein and connected together.

FIG. 5 depicts the splice 10 of FIGS. 1 to 3 in an open mode having inserted therein conductors 106 and 108 coupled to an electrical component, such as a capacitor 110, as described herein. In particular, in the embodiment of FIG. 5, conductor 106 comprises a coaxial cable that includes a segment in the form of a length of insulative covering 112 free of ground wires and an end that comprises a length of monofilament wire 114 extending from the length of insulative covering 112. The second conductor 108 comprises an insulated multifilament wire which includes a segment in the form of a length of insulative covering 116 and an end which comprises a length of multifilament wire 118 extending from the length of insulative covering 116. The capacitor 110 includes leads 120 and 122. The capacitor 110 may be coupled to the cable 106 and multifilament wire 108 before they are inserted into the wire splice 10. To this end, the monofilament wire 114 and the lead 120 are extended into respective opposite ends of a metal sleeve 124 which is crimped to form a coupler which mechanically and electrically couples the wire and lead together. Similarly, the multifilament wire 118 and the lead 122 are extended into respective opposite ends of a metal sleeve 126 which is crimped to form a coupler which mechanically and electrically couples the wire and lead together. In the embodiment of FIG. 5, a metal sleeve 128 is attached to an outer peripheral surface 130 of the cable 106 and a ground wire portion 132 formed by a length of ground wires of the coaxial cable 106 is folded back upon the metal sleeve 128 in a conventional manner.

After the monofilament wire 114 and multifilament wire 118 have been coupled to respective capacitor leads 120, 122 by respective sleeves 124, 126, such wires and the capacitor are enclosed in the splice 10. To this end, the length of insulative covering 112 may be inserted into channel 20, and a segment of the length of insulative covering 116 may be inserted into channels 30 and 34, as illustrated in FIG. 5. Similarly, the capacitor 110 is inserted into channel 32, the leads 120, 122 of the capacitor extending into respective channels 20 and 34. The splice members 12 and 14 are then pivoted relative to each other to a closed mode as depicted in phantom lines in FIGS. 2 and 3, the surfaces 56 and 64 of respective channels 20 and 40, and the protuberances 88 and 94 being structured and arranged to bear against the length of insulative covering 112 and the segment of the length of insulative covering 116, respectively, to hold the conductors 106, 108 in place within respective cavities 72 and 74 of the splice 10. When assembled in this manner, a coupling for conductors of the present invention is provided. If desired, the surfaces 60 and 68 of cavities 32 and 52 may be structured and arranged to bear against an outer surface 134 of the capacitor 110. In the closed mode, the end of monofilament wire 114, the capacitor lead 120 and the metal sleeve 124, will be located in the cavity 72 formed by channels 20 and 40. Similarly, the end of multifilament wires 118, capacitor lead 122, and the metal sleeve 126 will be located in the cavity 74 formed by channels 34 and 54. The length of insulative covering 112 will be bound or held in place by walls 56 and 64 by dimensioning the channel cavity 72 such that walls 56 and 64 bear against length 112 when the splice members 12 and 14 are pivoted about axis 82 into a closed mode. The length of insulative covering 116 is bound or held in place within the splice 10 by dimensioning the channel cavity 74 and the protuberances 88 and 94 such that the protuberances bear against the length of insulative covering 116 when splice members 12 and 14 are pivoted about axis 82 into a closed mode. In the preferred embodiment, the portion of the coaxial cable 106 from which the length of insulative covering 112 extends will bear against the ends 26 and 46 of respective splice members 12 and 14 at 136. If desired, one or more protuberances may be provided which extend into channels 20 and 40 towards respective axes 24 and 44 for the purpose of bearing against the peripheral surface of the insulative covering 112 when the splice 10 is in a closed mode. For example, with reference to FIGS. 1 and 5, a protuberance 138 is provided adjacent end 26 and a protuberance 140 is provided adjacent end 46. Protuberance 138 extends in circumferential direction 90 and protrudes towards axis 24, and protuberance 140 extends in circumferential direction 96 and protrudes towards axis 44.

Figure 7:
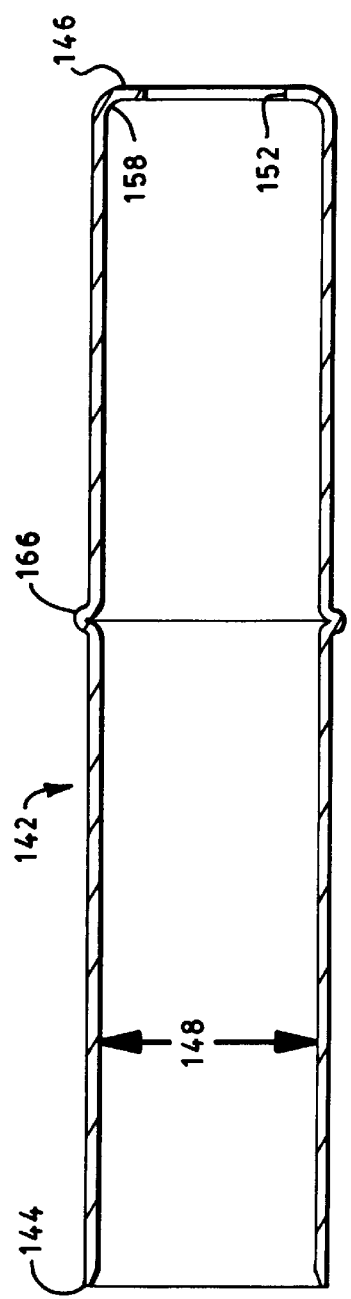
FIG. 7 is a sectional view of FIG. 6 along lines 7—7.

In one embodiment the wire splice of the present invention is inserted into a sleeve, the inner surface of which is dimensioned to bear against the outer surface of the wire splice. FIGS. 6 and 7 illustrate one embodiment of such a sleeve 142. Sleeve 142 is a cylindrically shaped metal sleeve having a fully opened end 144 and a partially opened opposite end 146. The inner diameter 148 of the sleeve 142 is equal to or slightly less than the outer diameter 150 (FIG. 2) of the wire splice 10 which is substantially cylindrical in the closed mode. With reference to FIG. 4, after the wire splice has been assembled as described herein, the conductor 108 and the insulated terminal housing 150 attached to the end thereof, are inserted into end 14 of the sleeve 142. The insulated terminal housing 150 and conductor 108 pulled or pushed through an opening 152 of the sleeve 142 at end 146 until the ends 28 and 48 of the wire splice 10 engages the end 146 of the sleeve. Due to the relative dimensions of the diameters 148 and 150, the sleeve 142 provides a force fit for the wire splice 10 thereby firmly holding the two together. The sleeve 142 facilitates maintaining the wire splice 10 in a closed mode. In the embodiment illustrated in the drawings, the ends 28 and 48 of the wire splice 10 are rounded at 154 and 156 respectively, to facilitate insertion of the wire splice into the sleeve 142. In particular, ends 28 and 48 each comprise a radiused outer peripheral edge at 154 and 156. The end 146 of the sleeve 142 may also be rounded as at 158 so as to mate with the rounded portions 154 and 156. In particular, end 146 of sleeve 142 comprises a radiused end portion 158 internal of the sleeve. End portion 158 mates with the radiused edges 154 and 156 as illustrated in FIG. 4. In the embodiment illustrated in FIG. 4, the ground wire portion 132, formed by the length of ground wires 132 of the coaxial cable 106 folded back upon the metal sleeve 128, is sandwiched between the metal sleeve 128 and the metal sleeve 142.

With reference to FIG. 4, a clamp 160 may be provided for the purpose of attaching the wire splice to a support surface, if desired. For example, the clamp 160 may include an end 162 which is clamped to the sleeve 142 and an end 164 which is attached to a surface of an automobile to hold the wire splice 10 in place. The sleeve 142 may be provided with a circumferential flanged portion 166 that serves as a stop for end 162 of the clamp 160 as illustrated in FIG. 4. In particular, end 162 engages the flanged portion 166 at 168, the flanged portion serving to locate the clamp 160 relative to the sleeve 142.

The embodiments which have been described herein are but some of several which utilize this invention and are set forth here by way of illustration but not of limitation. It is apparent that many other embodiments, which will be readily apparent to those skilled in the art, may be made without departing materially from the spirit and scope of this invention.

What is claimed is:

1. A coupling for conductors, comprising:
a splice comprising a first splice member and a second splice member each comprising a first surface, an opposite second surface, a first channel extending into said first surface towards said opposite second surface, said first channel further extending in the direction of a longitudinal axis of said splice from a first end of said splice towards an opposite second end of said splice, a second channel extending into said first surface towards said second surface, said second channel further extending in the direction of said longitudinal axis of said splice from said opposite second end towards said first end, a third channel extending into said first surface towards said second surface, said third channel further extending in the direction of said longitudinal axis from said first channel towards said opposite second end, and a fourth channel extending into said first surface towards said second surface, said fourth channel further extending in the direction of said longitudinal axis from said second channel to said third channel, said first splice member being connected to said second splice member such that said first channel, second channel, third channel and fourth channel of said first splice member are in alignment with said first channel, second channel, third channel and fourth channel, respectively, of said second splice member, to form a respective first cavity, second cavity, third cavity and fourth cavity, formed by walls of each said first channel, second channel, third channel and fourth channel, respectively;

a first conductor having a segment which extends into said first cavity and a first conductor end which is positioned in said first cavity;

a second conductor having a segment, which extends through said second cavity and into said fourth cavity and is bound by said walls of said second channel, and a second conductor end which is positioned in said fourth cavity;

an electrical component having a first lead and a second lead, said electrical component being positioned in said third cavity, said first lead extending into said first cavity and having a first lead end adjacent said first conductor end, and said second lead extending into said fourth cavity and having a second lead end adjacent said second conductor end; and a first coupler which couples said first conductor end to said first lead end, and a second coupler which couples said second conductor end to said second lead end.

2. The coupling of claim 1 wherein said first conductor comprises a coaxial cable and said segment of said first conductor comprises a length of insulative covering of said coaxial cable free of ground wire, and said first conductor end is a length of monofilament wire of said coaxial cable extending from said length of insulative covering of said coaxial cable, further wherein said second conductor comprises an insulated multifilament wire and said segment of said second conductor comprises a length of insulative covering of said insulated multifilament wire, and said second conductor end is a length of multifilament wire of said insulative multifilament wire extending from said length of said insulative covering of said insulated multifilament wire, and further wherein said electrical component is a capacitor.

3. The coupling of claim 1 wherein each said second channel comprises at least one protuberance.

4. The coupling of claim 3 wherein said at least one protuberance comprises a plurality of rows of protuberances, each row of said plurality of rows extending in a circumferential direction relative to a respective horizontal axis of said first splice member and said second splice member, each horizontal axis being coincident with a longitudinal axis of said splice in said closed mode.

5. The coupling of claim 1 wherein said first splice member comprises at least one coupler and said second splice member comprises at least one mating coupler.

6. The coupling of claim 1 wherein said first conductor is bound by said walls of said first channel.

7. The coupling of claim 1 wherein said first splice member is pivotally connected to said second splice member along a pivot axis, said first channel, second channel, third channel and fourth channel of said first splice member being radially in alignment relative to said pivot axis with said first channel, second channel, third channel and fourth channel, respectively, of said second splice member.

8. The coupling of claim 1 further including a sleeve which extends from one end to another end, said splice extending into said sleeve, an inner surface of said sleeve engaging an outer surface of said splice, said first conductor extending out of one end of said sleeve and said second conductor extending out of an opposite end of said sleeve.

9. The coupling of claim 8 wherein said second end of said first splice member and said second end of said second splice member each comprise a radiused outer peripheral edge, and said opposite end of said sleeve comprises a mating radiused end portion internal of said sleeve.

* * * * *